M. JUBAK & J. SMELA.
STEERING GEAR.
APPLICATION FILED SEPT. 16, 1913.
1,119,703.
Patented Dec. 1, 1914.
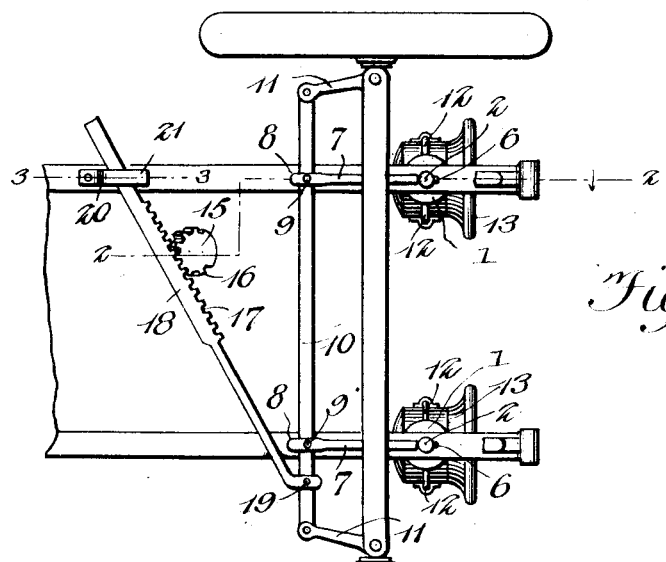
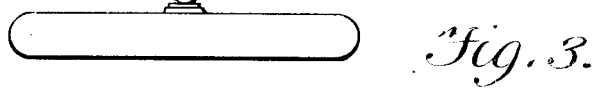
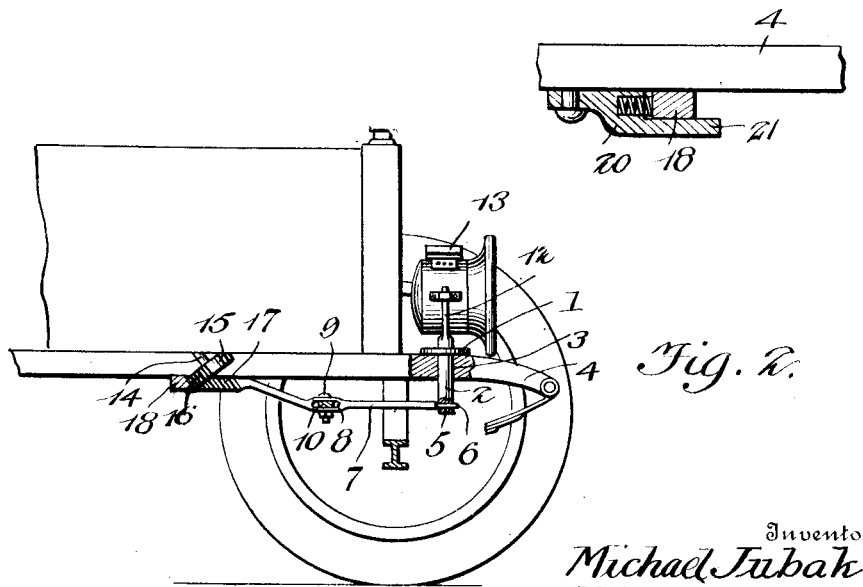
Inventors
Michael Jubak
John Smela
By Victor J. Evans
Attorney
Witnesses.

UNITED STATES PATENT OFFICE.

MICHAEL JUBAK AND JOHN SMELA, OF LANSFORD, PENNSYLVANIA.

STEERING-GEAR.

1,119,703.  Specification of Letters Patent.  Patented Dec. 1, 1914.

Application filed September 16, 1913. Serial No. 790,077.

*To all whom it may concern:*

Be it known that we, MICHAEL JUBAK, a citizen of the United States of America, and JOHN SMELA, a subject of the King of Hungary, residing at Lansford, in the county of Carbon and State of Pennsylvania, have invented new and useful Improvements in Steering-Gear, of which the following is a specification.

This invention relates to improvements in steering gear for automobiles and similar vehicles and consists in the construction, combination and arrangement of devices hereinafter described and claimed.

In the accompanying drawings: Figure 1 is a bottom plan view of a bottom portion of an automobile provided with steering gear and headlights. Fig. 2 is a vertical sectional view of the same on the plane indicated by the line 2—2 of Fig. 1. Fig. 3 is a detail section on the plane indicated by the line 3—3 of Fig. 1.

The device comprises platforms or brackets 1 having vertical stems 2, which are extended through passages 3 in the portions 4 of the vehicle, and as illustrated these stems are provided adjacent their lower ends with horizontal passages 5 in which are fitted extensions 6 on the forward ends of links or crank arms 7. These arms are provided with bifurcated portions 8, which are pivotally connected at 9 with the steering or connecting rod 10, the latter being of the usual or any well known construction and having connection through the crank arms 11 with the front steering wheels of the machine. The platforms or brackets 1 are preferably provided with side arms 12, in which the head lamps 13 are mounted.

The steering post 14 is provided at its lower end with an interrupted gear 15 having an arcuate series of teeth 16, which are adapted to intermesh with the teeth 17 on a horizontal sliding rack bar 18. This bar is tangentially disposed relatively of the gear upon the steering post and as shown its forward end has pivotal connection at 19 with the connecting rod 10 near one end of the latter. A guide plate 20 is mounted beneath the machine and preferably supported from the chassis thereof and provided with a lower extension 21 which underlies the free end of the rack bar 18 and which serves to maintain operative correlated positions of the bar and the gear wheel so that when the latter is operated the bar will be moved and draft applied to the connecting bar 10 with a resultant adjustment of the steering wheels together with a simultaneous adjustment of the head lamps. In this manner a direct and positive connection is formed between the steering post and the rod 10 so that the lamps may be uniformly adjusted and the rays of light drawn directly onto the roadway at all times.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as claimed.

Having thus described our invention, what we claim is:—

In combination with a vehicle having steering wheels, a steering post, arms extending from the steering wheels, a bar connecting the arms, a sliding rack bar pivotally connected at one end to the connecting bar and having its teeth arranged to mesh with the tooth member of the steering post, a fixed bracket secured under the vehicle body receiving the front end of the rack bar and operable to keep the rack bar in engaged position with the toothed member of the steering post and a spring carried by said bracket and bearing against the rack bar on the side opposite the steering post.

In testimony whereof we affix our signatures in presence of two witnesses.

MICHAEL JUBAK.
JOHN SMELA.

Witnesses:
J. GLUCK,
FRANK VAHORICK.